US011110911B2

(12) United States Patent
Omori

(10) Patent No.: US 11,110,911 B2
(45) Date of Patent: Sep. 7, 2021

(54) MEASUREMENT DEVICE, MEASUREMENT SYSTEM, AND MEASUREMENT METHOD

(71) Applicant: SEIKO EPSON CORPORATION, Tokyo (JP)

(72) Inventor: Keishi Omori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/778,351

(22) Filed: Jan. 31, 2020

(65) Prior Publication Data
US 2020/0247392 A1 Aug. 6, 2020

(30) Foreign Application Priority Data
Feb. 1, 2019 (JP) .............................. JP2019-016849

(51) Int. Cl.
*B60W 20/50* (2016.01)

(52) U.S. Cl.
CPC ......... *B60W 20/50* (2013.01); *B60W 2420/22* (2013.01); *B60W 2420/905* (2013.01)

(58) Field of Classification Search
CPC .. G01D 1/00; G01D 1/16; G01D 1/18; G01D 13/00; G01D 13/02; G01D 13/04; G01D 21/00; G01D 21/02; G01D 18/00; G01P 21/00; G01L 13/00; G01L 13/002; G01L 13/02; G01L 13/04; G01L 13/047; B61L 1/00; B61L 1/04; B61L 1/06; B61L 1/08; B61L 1/14; B61L 1/16; B61L 1/162; B61L 1/168; B61L 1/169; B61L 1/20; G01G 19/00; G01G 19/03; G01G 19/04; G01G 19/042; G01G 19/045; G01G 19/047; G01G 19/08; G01G 19/086; G01G 19/02; G01G 19/021; G01G 19/022; G01G 19/024; G01G 19/34; G01G 19/41; G01G 21/00; G01G 21/14; G01G 21/16; G01G 21/161; G01G 23/00; G01G 23/01; B60W 20/50; B60W 2420/22; B60W 2420/905

(Continued)

(56) References Cited

U.S. PATENT DOCUMENTS

| 5,111,897 A * | 5/1992 | Snyder ...................... G01P 3/64 177/1 |
| 2015/0316426 A1* | 11/2015 | Feichtinger ............ G08G 1/052 702/42 |
| 2016/0221591 A1* | 8/2016 | Kuehbandner ....... B61L 23/047 |

FOREIGN PATENT DOCUMENTS

| CN | 201974224 | 9/2011 |
| JP | H11-20505 | 1/1999 |

(Continued)

*Primary Examiner* — Anthony R Jimenez
(74) *Attorney, Agent, or Firm* — Workman Nydegger

(57) ABSTRACT

There is provided a measurement device including a data acquisition unit that acquires pieces of first to third data output from first to third sensors provided on a structure, an abnormality determination unit that determines whether or not each of the sensors is abnormal, a moving object detection unit that detects a moving object based on at least one of the first data and the second data, and a displacement amount calculation unit that calculates a displacement amount of the structure based on the third data, in which, when the first sensor provided on a main girder closest to an i-th lane of the structure or a main girder second closest to the i-th lane is not abnormal, the moving object detection unit detects the moving object moving on the i-th lane based on the first data output from the first sensor.

7 Claims, 9 Drawing Sheets

(58) Field of Classification Search
USPC .......................................................... 701/29.7
See application file for complete search history.

(56) References Cited

FOREIGN PATENT DOCUMENTS

| | | |
|---|---|---|
| JP | 2016-126605 | 7/2016 |
| JP | 2018-066637 | 4/2018 |

\* cited by examiner

MEASUREMENT DEVICE, MEASUREMENT SYSTEM, AND MEASUREMENT METHOD

The present application is based on, and claims priority from JP Application Serial Number 2019-016849, filed Feb. 1, 2019, the disclosure of which is hereby incorporated by reference herein in its entirety.

BACKGROUND

1. Technical Field

The present disclosure relates to a measurement device, a measurement system, and a measurement method.

2. Related Art

JP-A-2018-66637 discloses a measurement system including first sensors and second sensors, the first sensors being sensors provided on one end portion and the other end portion of a structure so as to detect an entry and an exit of a moving object, and the second sensors being sensors provided on the center portion of the structure so as to detect a bending of the structure. The measurement system detects the moving object moving on the structure based on detection signals of the first sensors, and measures a weight of the moving object based on detection signals of the first sensors and detection signals of the second sensors.

However, in the measurement system disclosed in JP-A-2018-66637, it is not considered that the sensors are in an abnormal state such as missing or malfunction, and as a result, there is a concern that calculations cannot be continued when the sensors are abnormal.

SUMMARY

An aspect of a measurement device according to the present disclosure includes: a data acquisition unit that acquires first data, second data, and third data, the first data being data output from a first sensor provided on a structure and representing an impact due to one of an entry of a moving object to the structure and an exit of the moving object from the structure, the second data being data output from a second sensor provided on the structure and representing an impact due to the other of the entry of the moving object to the structure and the exit of the moving object from the structure, and the third data being data output from a third sensor provided on the structure and representing a bending of the structure due to the moving object; an abnormality determination unit that determines whether or not each of the first sensor, the second sensor, and the third sensor is abnormal; a moving object detection unit that detects the moving object moving on the structure based on at least one of the first data and the second data; and a displacement amount calculation unit that calculates a displacement amount of the structure based on the third data, in which, for an integer m equal to or larger than 1 and an integer n equal to or larger than 1, the structure includes first to m-th lanes and n main girders, for an integer k equal to or larger than 1 and equal to or smaller than n, the k first sensors are respectively provided on the k main girders of the structure, and for an integer i equal to or larger than 1 and equal to or smaller than m, when the abnormality determination unit determines that the first sensor provided on the main girder closest to an i-th lane of the structure or the main girder second closest to the i-th lane is not abnormal among the k first sensors, the moving object detection unit detects the moving object moving on the i-th lane based on the first data output from the first sensor.

In the aspect of the measurement device, for an integer p equal to or larger than 1 and equal to or smaller than n, the p second sensors may be respectively provided on the p main girders of the structure, and when the abnormality determination unit determines that the second sensor provided on the main girder closest to the i-th lane or the main girder second closest to the i-th lane is not abnormal among the p second sensors, the moving object detection unit may detect the moving object moving on the i-th lane based on the second data output from the second sensor.

In the aspect of the measurement device, for an integer q equal to or larger than 1 and equal to or smaller than n, the q third sensors may be respectively provided on the q main girders of the structure, and when the abnormality determination unit determines that the third sensor provided on the main girder closest to the i-th lane or the main girder second closest to the i-th lane is not abnormal among the q third sensors, the displacement amount calculation unit may calculate a displacement amount of the structure on the i-th lane based on the third data output from the third sensor and information on the moving object detected by the moving object detection unit.

In the aspect, the measurement device may further include a weight calculation unit that calculates a weight of the moving object, and the weight calculation unit may calculate the weight of the moving object moving on the i-th lane based on the information on the moving object detected by the moving object detection unit and the displacement amount of the structure calculated by the displacement amount calculation unit.

In the aspect of the measurement device, the first sensor, the second sensor, and the third sensor may be acceleration sensors.

An aspect of a measurement system according to the present disclosure includes: the measurement device according to the aspect; the first sensor; the second sensor; and the third sensor.

An aspect of a measurement method according to the present disclosure includes: a data acquisition step of acquiring first data, second data, and third data, the first data being data output from a first sensor provided on a structure and representing an impact due to one of an entry of a moving object to the structure and an exit of the moving object from the structure, the second data being data output from a second sensor provided on the structure and representing an impact due to the other of the entry of the moving object to the structure and the exit of the moving object from the structure, and the third data being data output from a third sensor provided on the structure and representing a bending of the structure due to the moving object; an abnormality determination step of determining whether or not each of the first sensor, the second sensor, and the third sensor is abnormal; a moving object detection step of detecting the moving object moving on the structure based on at least one of the first data and the second data; and a displacement amount calculation step of calculating a displacement amount of the structure based on the third data, in which, for an integer m equal to or larger than 1 and an integer n equal to or larger than 1, the structure includes first to m-th lanes and n main girders, for an integer k equal to or larger than 1 and equal to or smaller than n, the k first sensors are respectively provided on the k main girders of the structure, and for an integer i equal to or larger than 1 and equal to or smaller than m, in the abnormality determination step, when it is determined that the first sensor provided on the main girder closest to an i-th lane of the structure or the main girder second closest to the i-th lane is not abnormal among the k first sensors, in the moving object detection step, the moving object moving on the i-th lane is detected based on the first data output from the first sensor.

DESCRIPTION OF EXEMPLARY EMBODIMENTS

Hereinafter, preferred embodiments of the present disclosure will be described in detail with reference to the drawings. The embodiments to be described do not unreasonably limit the contents of the present disclosure described in the appended claims. Further, all components to be described are not essential configurations of the present disclosure.
1. Measurement System
1-1. System Configuration Example A measurement system according to the present embodiment includes a first sensor, a second sensor, a third sensor, which are provided on a structure, and a measurement device that calculates a weight of a moving object moving on the structure. The first sensor outputs first data representing an impact due to one of an entry of the moving object to the structure and an exit of the moving object from the structure, and the second sensor outputs second data representing an impact due to the other one of the entry of the moving object to the structure and the exit of the moving object from the structure. Further, the third sensor outputs third data representing bending of the structure by the moving object. Hereinafter, in this specification, an example in which the structure is a bridge and the moving object is a vehicle will be described. Here, the structure is not limited to a bridge as long as the structure causes displacement (in a narrow sense, bending) due to a weight of the moving object. Further, the moving object is not limited to a vehicle as long as the moving object moves on the structure while applying a load to the structure.

Figure 1:
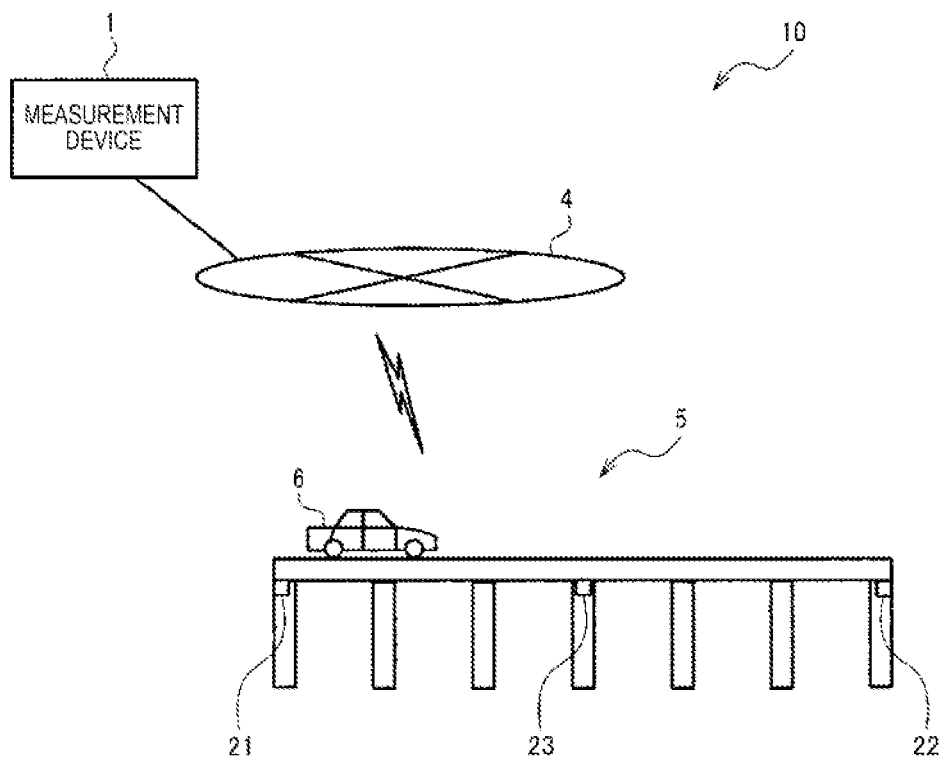
FIG. 1 is a diagram illustrating a configuration example of a measurement system.

FIG. 1 is a diagram illustrating an example of a measurement system according to the present embodiment. As illustrated in FIG. 1, a measurement system 10 according to the present embodiment includes a measurement device 1, a sensor 21 provided on one end portion of a bridge 5 as a structure, a sensor 22 provided on the other end portion of the bridge 5, and a sensor 23 provided on the center portion of the bridge 5. The measurement device 1 can communicate with the sensor 21, the sensor 22, and the sensor 23 via, for example, a wireless network for mobile phones and a communication network 4 such as the Internet.

For example, the sensor 21 functions as a first sensor that outputs first data representing an impact due to an entry of a vehicle 6 as a moving object to the bridge 5, and the sensor 22 functions as a second sensor that outputs second data representing an impact due to an exit of the vehicle 6 from the bridge 5. Alternatively, the sensor 22 functions as a first sensor that outputs first data representing an impact due to an exit of the vehicle 6 from the bridge 5, and the sensor 21 functions as a second sensor that outputs second data representing an impact due to an entry of the vehicle 6 to the bridge 5. Further, the sensor 23 functions as a third sensor that outputs third data representing bending of the bridge 5 by the vehicle 6. In the present embodiment, each of the sensor 21, the sensor 22, and the sensor 23 is an acceleration sensor, and may be, for example, a crystal acceleration sensor or a micro electro mechanical systems (MEMS) acceleration sensor.

The sensor 21 detects acceleration of the bridge 5 when the vehicle 6 enters the bridge 5, and the sensor 22 detects acceleration of the bridge 5 when the vehicle 6 exits the bridge 5. That is, the sensor 21 is an acceleration sensor that detects an entry of the vehicle 6 to the bridge 5, and the sensor 22 is an acceleration sensor that detects an exit of the vehicle 6 from the bridge 5.

Each of the sensors 21 and 22 may be one that can detect the entry of the vehicle 6 to the bridge 5 and the exit of the vehicle 6 from the bridge 5, and positions at which the sensors 21 and 22 are provided are not limited to the end portions of the bridge 5. For example, the sensors 21 and 22 may be provided at positions several meters away from the end portions of the bridge 5.

A floor slab, a main girder, and the like of the bridge 5 are bent downward in a vertical direction by a load of the vehicle 6 moving on the bridge 5, that is, the vehicle 6 traveling on the bridge 5. The sensor 23 is provided on the center portion of the bridge 5, and detects acceleration of bending of the bridge 5, for example, acceleration of bending of the floor slab and the main girder due to the load of the vehicle 6 traveling on the bridge 5.

The measurement device 1 calculates a speed and displacement of bending of the bridge 5 due to traveling of the vehicle 6 based on pieces of acceleration data output from the sensors 21, 22, and 23. The measurement device 1 calculates a weight of the vehicle 6 traveling on the bridge 5 based on the calculated displacement.

Figure 2:
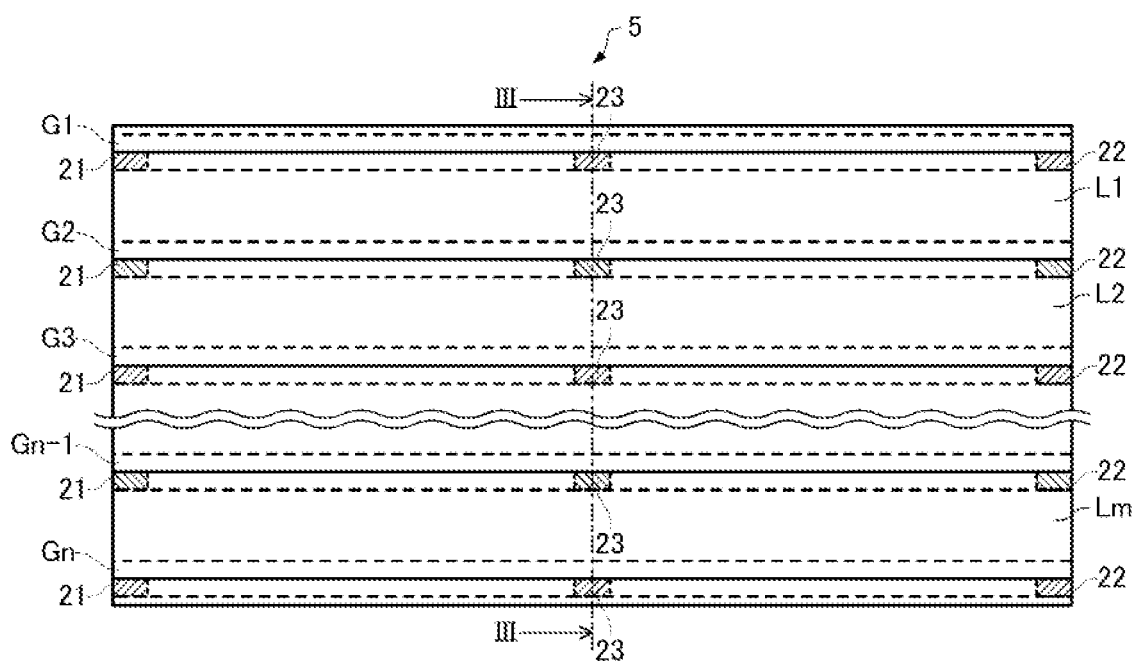
FIG. 2 is a view illustrating an example in which sensors are provided on a bridge.
Figure 3:
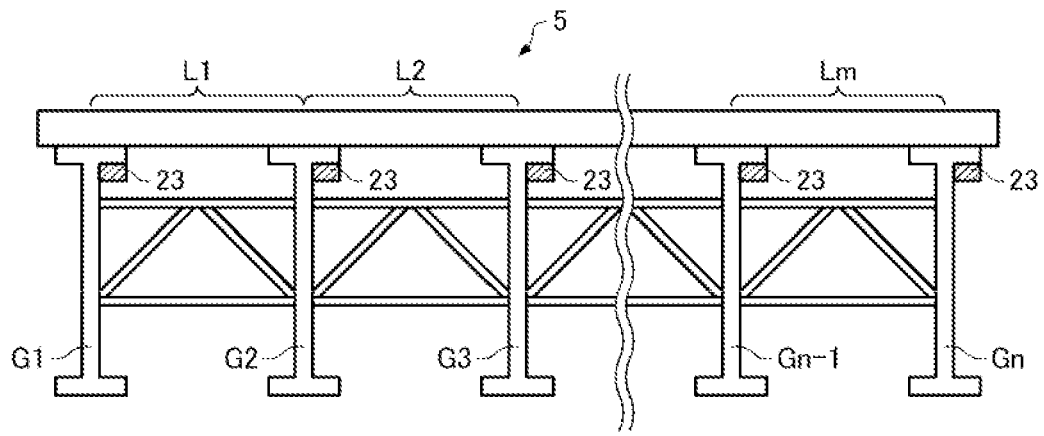
FIG. 3 is a view illustrating an example in which sensors are provided on a bridge.

FIGS. 2 and 3 are views illustrating examples in which the sensors 21, 22, and 23 are provided on the bridge 5. FIG. 2 is a view of the bridge 5 when viewed from above, and FIG. 3 is a sectional view of the bridge 5 taken along a line III-III of FIG. 2.

As illustrated in FIGS. 2 and 3, the bridge 5 as a structure includes m lanes including a first lane L1 to an m-th lane Lm and n main girders including a first main girder G1 to an n-th main girder Gn. Here, each of m and n is an integer of one or more. In the example of FIGS. 2 and 3, a position of each of the main girders G1 to Gn matches with a position of each of boundaries between the lanes L1 to Lm, and m=n−1. On the other hand, it is not necessary that the position of each of the main girders G1 to Gn matches with the position of each of the boundaries between the lanes L1 to Lm, and it may be that m≠n−1.

In the example of FIGS. 2 and 3, k sensors 21 as first sensors are respectively provided on k main girders among the main girders G1 to Gn, and p sensors 22 as second sensors are respectively provided on p main girders among the main girders G1 to Gn. Here, each of k and p is an integer equal to or larger than 1 and equal to or smaller than n. Further, k sensors 22 as first sensors may be respectively provided on k main girders among the main girders G1 to Gn, and p sensors 21 as second sensors may be respectively provided on p main girders among the main girders G1 to Gn. In the example of FIGS. 2 and 3, q sensors 23 as third sensors are respectively provided on q main girders among the main girders G1 to Gn. Here, q is an integer equal to or larger than 1 and equal to or smaller than n. In the example of FIGS. 2 and 3, the sensors 21, 22, and 23 are respectively provided on each of the main girders G1 to Gn, and k=p=q=n. On the other hand, at least one of the sensors 21, 22, and 23 may not be provided on at least one of the main girders G1 to Gn. That is, it may be that k≠n, p≠n, or q≠n. Further, the numbers of sensors 21, 22, and 23 may not match with each other. That is, it may be that k≠p, k≠q, or p≠q.

In the present embodiment, the measurement device 1 uses at least one of the pieces of the acceleration data output from each sensor 21 and the pieces of the acceleration data output from each sensor 22 in order to determine a lane on which the vehicle 6 travels. Further, the measurement device 1 uses the pieces of the acceleration data output from each sensor 21 in order to calculate a time when the vehicle 6 enters the lane, and uses the pieces of the acceleration data output from each sensor 22 in order to calculate a time when the vehicle 6 exits the lane. Therefore, preferably, each sensor 21 and each sensor 22 are provided such that there is a difference in output acceleration data depending on the lane on which the vehicle 6 travels. In the example of FIG. 2, each sensor 21 is provided on one end portion of the main girder, and each sensor 22 is provided on the other end portion of the main girder.

In the present embodiment, the measurement device 1 uses the pieces of the acceleration data output from each sensor 23 in order to calculate a displacement amount of the lane on which the vehicle 6 travels. Therefore, preferably, each sensor 23 is provided such that there is a difference in output acceleration data depending on the lane on which the vehicle 6 travels. In the example of FIG. 2, each sensor 23 is provided on the center portion of the main girder.

The numbers and the positions of the sensors 21, 22, and 23 are not limited to the example illustrated in FIGS. 1 to 3, and may be variously changed.

Figure 4:
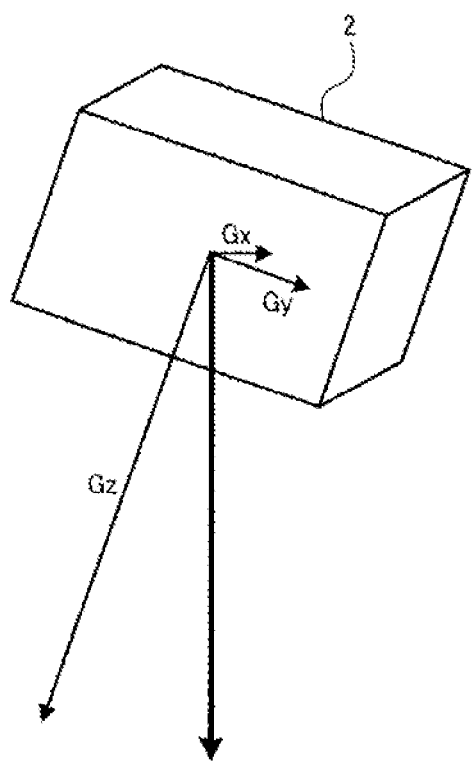
FIG. 4 is a diagram for explaining combined three-axis acceleration of an acceleration sensor.

FIG. 4 is a diagram for explaining combined three-axis acceleration of an acceleration sensor. The acceleration sensor is an acceleration sensor that can measure acceleration in each direction of three-axis directions perpendicular to each other.

In the acceleration sensor, one axis of three detection axes including an x axis, a y axis, and a z axis is aligned with a vertical direction. Thereby, the acceleration sensor can detect acceleration of bending of the bridge 5 in the vertical direction.

In a case where the acceleration sensors as the sensors 21, 22 and 23 are provided on the bridge 5, places at which the sensors are provided may be inclined. Even when one axis of the three detection axes of the acceleration sensor is not aligned with the vertical direction, the measurement device 1 can correct a measurement error due to the incline of the acceleration sensor by using a combined three-axis acceleration obtained by combining acceleration in the x axis, the y axis, and the z axis.

1-2. Configuration of Measurement Device

Figure 5:
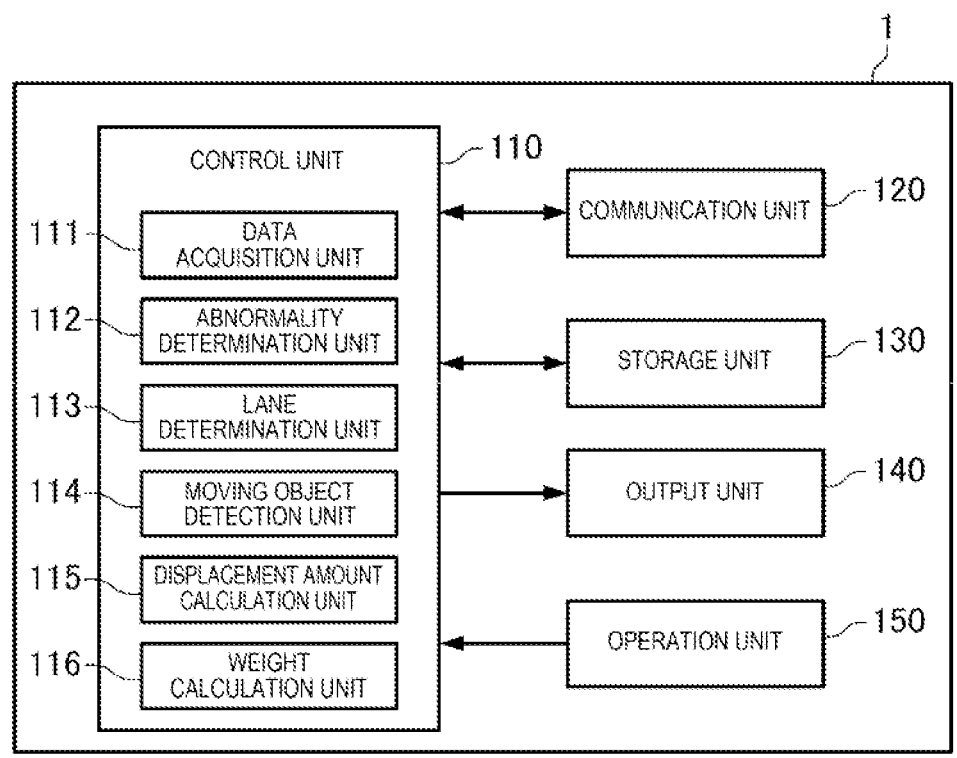
FIG. 5 is a diagram illustrating a configuration example of a measurement device.

FIG. 5 is a diagram illustrating a configuration example of the measurement device 1. As illustrated in FIG. 5, the measurement device 1 includes a control unit 110, a communication unit 120, a storage unit 130, an output unit 140, and an operation unit 150.

The control unit 110 calculates a weight of the vehicle 6 traveling on the bridge 5 based on the pieces of the acceleration data output from the sensors 21, 22, and 23 provided on the bridge 5.

The communication unit 120 receives the pieces of the acceleration data from the sensors 21, 22, and 23 via the communication network 4. The pieces of the acceleration data output from the sensors 21, 22, and 23 are, for example, digital signals. The communication unit 120 outputs the pieces of the acceleration data received from the sensors 21, 22 and 23, to the control unit 110.

The storage unit 130 stores a program, data, and the like, which are required for the control unit 110 to perform calculation processing and control processing. Further, the storage unit 130 stores a program, data, and the like, which are required for the control unit 110 to realize a predetermined application function. Various programs, data, and the like may be stored in advance in a non-volatile recording medium, or may be received by the control unit 110 from a server via the communication network 4 and stored in the storage unit 130. The storage unit 130 is configured with, for example, a various-type integrated circuit (IC) memory such as a read only memory (ROM), a flash ROM, or a random access memory (RAM), a recording medium such as a hard disk or a memory card, and the like.

The output unit 140 outputs a control result of the control unit 110 to a display device.

The operation unit 150 performs processing of acquiring operation data from a user and transmitting the operation data to the control unit 110.

The control unit 110 includes a data acquisition unit 111, an abnormality determination unit 112, a lane determination unit 113, a moving object detection unit 114, a displacement amount calculation unit 115, and a weight calculation unit 116. Functions of each unit of the control unit 110 are realized by, for example, a central processing unit (CPU) that executes a program stored in the storage unit 130. Alternatively, functions of each unit of the control unit 110 may be realized by a custom integrated circuit (IC) such as an application specific integrated circuit (ASIC), or may be realized by a CPU and an ASIC.

The data acquisition unit 111 acquires the pieces of the acceleration data output from each of the sensors 21, 22, and 23. Specifically, the data acquisition unit 111 acquires the pieces of the acceleration data received from each of the sensors 21, 22, and 23 by the communication unit 120. Further, the data acquisition unit 111 performs filtering on the pieces of the acceleration data output from each of the sensors 21 and 22 such that acceleration components due to the traveling of the vehicle 6 clearly appear.

The abnormality determination unit 112 determines whether or not each of the sensors 21, 22, and 23 is abnormal based on the pieces of the acceleration data acquired by the data acquisition unit 111. Details of the abnormality determination by the abnormality determination unit 112 will be described below.

The lane determination unit 113 determines the lane on which the vehicle 6 travels based on at least one of the pieces of the acceleration data output from each sensor 21 and the pieces of the acceleration data output from each sensor 22. Specifically, the moving object detection unit 114 compares levels of the pieces of the acceleration data output from each sensor 21 or compares levels of the pieces of the acceleration data output from each sensor 22, and determines the lane on which the vehicle 6 travels based on the comparison result. Details of the lane determination by the lane determination unit 113 will be described below.

The moving object detection unit 114 detects the vehicle 6 traveling on the bridge 5 based on at least one of the pieces of the acceleration data output from each sensor 21 and the pieces of the acceleration data output from each sensor 22. Specifically, the moving object detection unit 114 determines whether or not an entry time and an exit time of each axle of the vehicle 6 to and from the lane determined by the lane determination unit 113 can be calculated based on the determination result of the abnormality determination unit 112. In a case where it is determined that the calculation is possible, the moving object detection unit 114 calculates an entry time and an exit time of each axle of the vehicle 6. Details of the moving object detection by the moving object detection unit 114 will be described below.

The displacement amount calculation unit 115 calculates a displacement amount of the bridge 5 based on the pieces of the acceleration data output from each sensor 23. Specifically, the displacement amount calculation unit 115 determines whether or not a displacement amount of the bridge 5 on the lane determined by the lane determination unit 113 can be calculated based on the determination result of the abnormality determination unit 112. In a case where it is determined that the calculation is possible, the displacement amount calculation unit 115 calculates a displacement amount of the bridge 5. Details of the displacement amount calculation by the displacement amount calculation unit 115 will be described below.

The weight calculation unit 116 calculates a weight of the vehicle 6 traveling on the bridge 5. Specifically, the weight calculation unit 116 calculates a weight of the vehicle 6 traveling on the lane determined by the lane determination unit 113 using weigh-in-motion (WIM) based on the displacement amount calculated by the displacement amount calculation unit 115. Details of the weight calculation by the weight calculation unit 116 will be described below.

1-3. Method of Estimating Weight of Moving Object

Next, a method of estimating a weight of the vehicle 6 traveling on the bridge 5 using WIM will be described.

In WIM, a weight of the vehicle 6 is calculated based on the displacement of the bridge 5 due to the traveling of the vehicle 6 and influence line data indicating displacement of each point of the bridge 5 when a reference vehicle as a reference moving object travels on the bridge 5.

Figure 6:
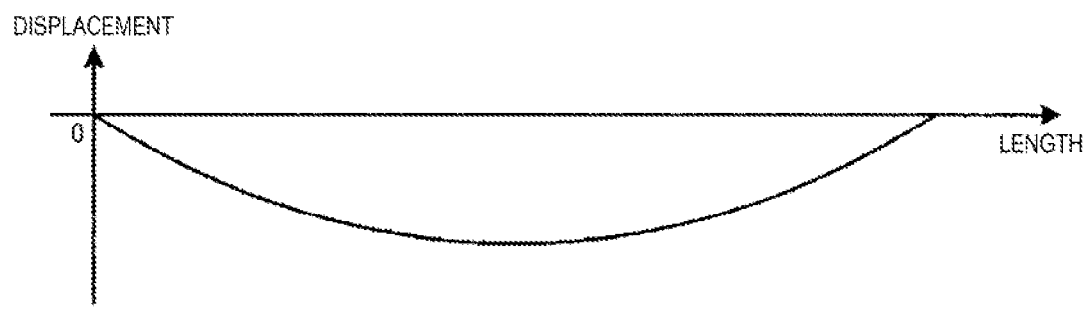
FIG. 6 is a diagram illustrating an example of influence line data.

FIG. 6 is a diagram illustrating an example of influence line data. In FIG. 6, a horizontal axis indicates a length of the bridge 5. In FIG. 6, a vertical axis indicates displacement of the bridge 5 in a vertical direction. A waveform illustrated in FIG. 6 illustrates influence line data of the bridge 5. The waveform of FIG. 6 illustrates displacement of bending of the bridge 5 at a certain point on each lane, for example, displacement of bending of the bridge 5 at the center portion of a span when a reference vehicle travels on each lane, the reference vehicle being a vehicle of which the weight is known in advance such as a one-ton vehicle. The influence line data is created and stored in advance, for example, before the measurement system 10 is operated.

Figure 7:
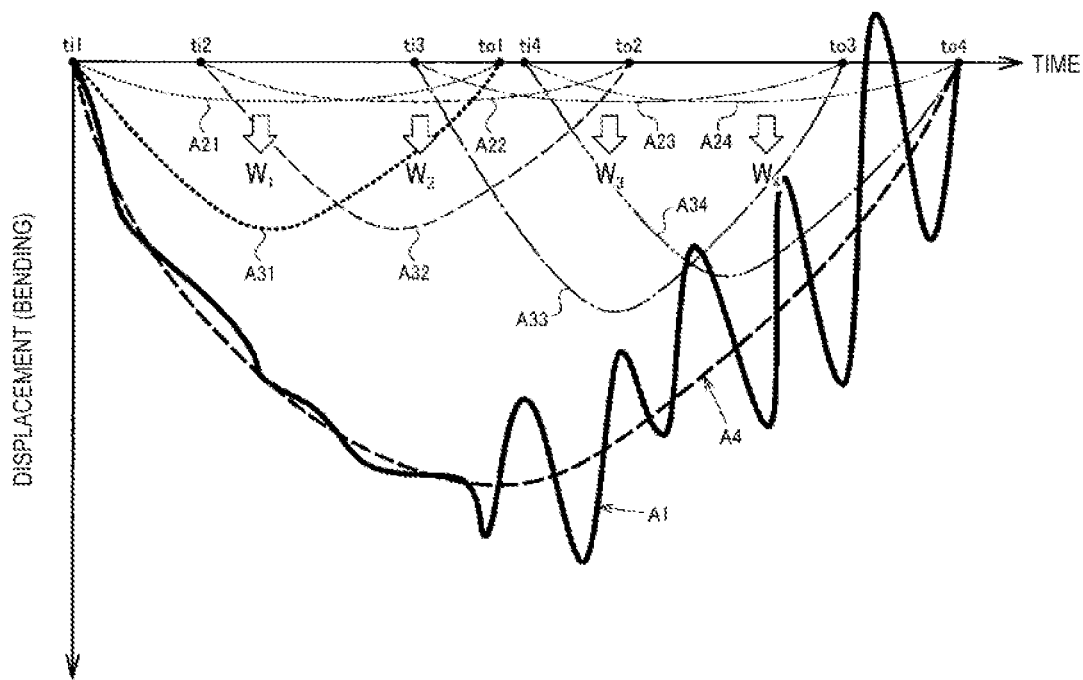
FIG. 7 is a diagram for explaining WIM.

FIG. 7 is a diagram for explaining WIM based on the influence line data and a calculation result using WIM. In FIG. 7, a horizontal axis indicates time, and a vertical axis indicates displacement of the bridge 5 in a vertical direction. In a case where the vehicle 6 of which the weight is to be estimated travels on the bridge 5, a time-series change in displacement of bending of the bridge 5 at a given point on each lane of the bridge 5 is obtained based on the pieces of the acceleration data output from each sensor 23. A waveform A1 illustrated in FIG. 7 represents displacement of bending of the bridge 5 when the vehicle 6 travels on a given lane of the bridge 5.

Figure 8:
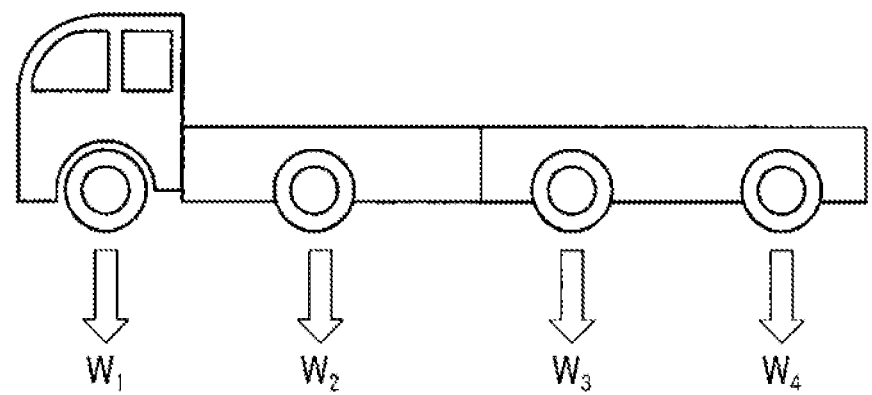
FIG. 8 is a diagram illustrating an example of a four-axle vehicle.

In WIM, the influence line data obtained in advance is mapped according to the number of axles of the vehicle 6. For example, when the vehicle 6 is a four-axle vehicle as illustrated in FIG. 8, four pieces of the influence line data indicated by A21 to A24 are mapped. When the influence line data is mapped, a horizontal axis length of the influence line data illustrated in FIG. 6 is converted into a time axis by using the entry time and the exit time of each axle of the vehicle 6 to and from each lane.

In the example of FIG. 7, a first axle of the vehicle 6 enters a given lane of the bridge 5 at a time "ti1" and exits from the lane at a time "to1". Thus, the influence line data A21 corresponding to the first axle is mapped such that "ti1" and "to1" correspond to end points. The same applies to a second axle to a fourth axle, and pieces of the influence line data A22 to A24 are mapped based on entry times "ti2" to "ti4" and exit times "to2" to "to4" of each axle.

The influence line data represents displacement of the bridge 5 when a vehicle having a predetermined weight, for example, a one-ton vehicle travels on the bridge 5. Thus, for an integer j from 1 to 4, when a weight of each axle of the vehicle 6 is Wj, displacement of the bridge 5 caused by each axle becomes Wj times the influence line data. That is, displacement caused by the first axle is represented by A31 that is W1 times A21. Similarly, displacement caused by the second axle is A32 that is W2 times A22, displacement caused by the third axle is A33 that is W3 times A23, and displacement caused by the fourth axle is A34 that is W4 times A24.

The displacement U caused by the entire vehicle 6 is the sum of A31 to A34, and is expressed by the following Equation (1).

$$U = W1 \times A21 + W2 \times A22 + W3 \times A23 + W4 \times A24 \quad (1)$$

In the example of FIG. 7, a waveform A4 represents the displacement U obtained by Equation (1). In WIM, axle weights W1 to W4 of the axles are estimated such that an error between the waveform A4 representing the displacement U obtained using the influence line data and the waveform A1 representing displacement measured using a sensor becomes small. Specifically, W1 to W4 may be determined using a mathematical method such as a least square method.

Then, W1+W2+W3+W4, which is the sum of the axle weights, is obtained as a weight of the vehicle 6.

The estimation method according to the present embodiment is not limited to the method applied to the measurement device 1. The estimation method according to the present embodiment may also be applied to, for example, the measurement system 10 including the sensors 21, 22, and 23 and the measurement device 1.

1-4. Abnormality Determination

The abnormality determination unit 112 determines whether or not each of the sensors 21, 22, and 23 is abnormal based on the pieces of the acceleration data which are output from each of the sensors 21, 22, and 23 and are acquired by the data acquisition unit 111.

For example, when each of the sensors 21, 22, and 23 has a self-diagnosis function and it is determined that there is a failure based on results of self-diagnosis, the sensor having a failure may output acceleration data having an abnormal value, for example, acceleration data obtained when unusual acceleration such as 99G is applied, and the abnormality determination unit 112 may determine that each of the sensors 21, 22, and 23 from which the acceleration data having an abnormal value is output is abnormal.

Further, for example, when the acceleration data is not output from each of the sensors 21, 22, and 23, it may be determined that each of the sensors 21, 22, and 23 is dropped and there is an abnormality in the sensors 21, 22, and 23.

Further, for example, when each of the sensors 21, 22, and 23 is provided on the main girder such that each detection axis faces a specific direction with respect to a gravitational acceleration direction, the abnormality determination unit 112 may calculate a gravitational acceleration direction based on the pieces of the acceleration data output from each of the sensors 21, 22, and 23, and determine that each of the sensors 21, 22, and 23, of which each detection axis does not face a specific direction with respect to the calculated gravitational acceleration direction, is dropped and there is an abnormality in the sensors 21, 22, and 23.

1-5. Lane Determination

A relative positional relationship between the lanes L1 to Lm of the bridge 5 and the main girders G1 to Gn is, for example, as illustrated in FIGS. 2 and 3. In the example of FIGS. 2 and 3, for example, when m=n−1 and i is an integer equal to or larger than 1 and equal to or smaller than m, the i-th main girder Gi is closest to the i-th lane Li, and the i+1-th main girder Gi+1 is second closest to the i-th lane Li. Thus, for example, the vehicle 6 traveling on the first lane L1 is within a short distance from the main girders G1 and G2, and is within a relatively long distance from the main girders G3 to Gn. Similarly, the vehicle 6 traveling on the second lane L2 is within a short distance from the main girders G2 and G3, and is within a relatively long distance from the main girders G1, and G4 to Gn.

In a case where the vehicle 6 travels on the first lane L1 of the bridge 5, based on the relative positional relationship, levels of the pieces of the acceleration data output from the sensors 21 provided on the main girders G1 and G2 are higher than levels of the pieces of the acceleration data output from the sensors 21 provided on the main girders G3 to Gn. Similarly, when the vehicle 6 travels on the second lane L2 of the bridge 5, levels of the pieces of the acceleration data output from the sensors 21 provided on the main girders G2 and G3 are higher than levels of the pieces of the acceleration data output from the sensors 21 provided on the main girders G1, and G4 to Gn.

Figure 9:
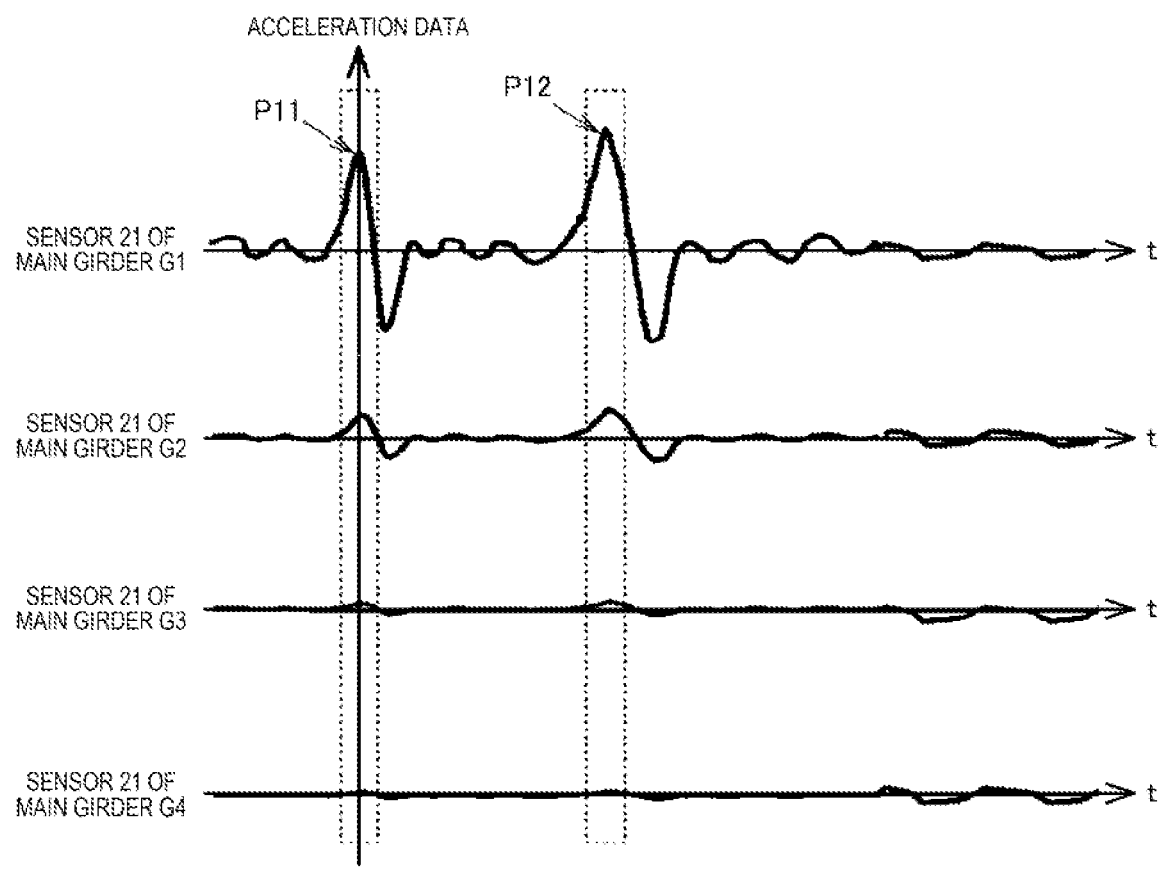
FIG. 9 is a diagram illustrating examples of signal waveforms of the sensors.

FIG. 9 is a diagram illustrating an example of the acceleration data output from each sensor 21 when the vehicle 6 travels on the first lane L1 of the bridge 5. The example of FIG. 9 is an example when the number n of the main girders of the bridge 5 is four. Each waveform illustrated in FIG. 9 is a waveform obtained by performing filtering on the acceleration data in order to clarify peaks.

In the four waveforms, peaks P11 and P12 indicate passage of the axles of the vehicle 6. Each of the four waveforms has two peaks P11 and P12, and thus the vehicle 6 is a two-axle vehicle. The peak P11 indicates passage of the front wheel axle of the vehicle 6, and the peak P12 indicates passage of the rear wheel axle of the vehicle 6.

In the example of FIG. 9, levels of the peaks P11 and P12 of the pieces of the acceleration data respectively output from the sensors 21 provided on the main girders G1 and G2 are higher than levels of the peaks P11 and P12 of the pieces of the acceleration data respectively output from the sensors 21 provided on the main girders G3 and G4, and thus it can be determined that the vehicle 6 travels on the lane L1.

The relative positional relationship between the lanes L1 to Lm and the main girders G1 to Gn may be different from that in FIGS. 2 and 3. On the other hand, generally, for an integer i equal to or larger than 1 and equal to or smaller than m, when the vehicle 6 travels on the i-th lane Li, the level of the acceleration data output from the sensor 21 provided on the main girder closest to the lane Li or the main girder second closest to the lane Li is higher than the levels of the pieces of the acceleration data output from the sensors 21 provided on the other main girders. Similarly, when the vehicle 6 travels on the lane Li, the level of the acceleration data output from the sensor 22 provided on the main girder closest to the lane Li or the main girder second closest to the lane Li is higher than the levels of the pieces of the acceleration data output from the sensors 22 provided on the other main girders.

Therefore, the lane determination unit 113 can determine the lane on which the vehicle 6 travels by comparing the levels of the pieces of the acceleration data output from each sensor 21 and acquired by the data acquisition unit 111. Further, the lane determination unit 113 can also determine the lane on which the vehicle 6 travels by comparing the levels of the pieces of the acceleration data output from each sensor 22 and acquired by the data acquisition unit 111. The lane determination unit 113 determines the lane on which the vehicle 6 travels using the pieces of the acceleration data, which are filtered by the data acquisition unit 111 such that acceleration components due to the traveling of the vehicle 6 clearly appear.

Even when the sensor 21 or the sensor 22 is not provided on the main girder Gi among the n main girders G1 to Gn, or even when the sensor 21 or the sensor 22 provided on the main girder Gi is abnormal, the moving object detection unit 114 can perform the lane determination using the acceleration data output from the sensor 22 provided on the main girder Gi. For example, in the example of FIG. 9, the vehicle 6 travels on the first lane L1 of the bridge 5, and thus the level of the acceleration data output from the sensor 22 provided on the main girder G1 is relatively higher than the levels of the pieces of the acceleration data respectively output from the sensors 21 provided on the main girders G2, G3, and G4. Therefore, when the sensor 21 is not provided on the main girder G1 or when the sensor 21 provided on the main girder G1 is abnormal, it is possible to determine the lane on which the vehicle 6 travels using the acceleration data output from the sensor 22 provided on the main girder G1 and the pieces of the acceleration data respectively output from the sensors 21 provided on the main girders G2, G3, and G4.

The number and arrangement of the sensors 21 and 22 are determined such that at least the lane on which the vehicle 6 travels can be determined. Further, preferably, the number and arrangement of the sensors 21 and 22 have redundancy such that the lane on which the vehicle 6 travels can be determined even when some of the sensors 21 and 22 are abnormal.

1-6. Moving Object Detection

In a case where the lane determination unit 113 determines that the vehicle 6 travels on the i-th lane Li of the bridge 5, the moving object detection unit 114 calculates a time when each axle of the vehicle 6 enters the lane Li of the bridge 5 using the acceleration data which is output from the sensor 21 provided on the main girder closest to the lane Li or the main girder second closest to the lane Li and is filtered. For example, in the example of FIG. 9, the moving object detection unit 114 may obtain timings of the peaks P11 and P12 of the acceleration data output from the sensor 21 provided on the main girder G1 or the main girder G2, and set the timings as times when the front wheel and the rear wheel of the vehicle 6 respectively enter the first lane L1.

Similarly, when the lane determination unit 113 determines that the vehicle 6 travels on the i-th lane Li of the bridge 5, the moving object detection unit 114 calculates a time when each axle of the vehicle 6 exits from the lane Li of the bridge 5 using the acceleration data which is output from the sensor 22 provided on the main girder closest to the lane Li or the main girder second closest to the lane Li and is filtered.

The storage unit 130 of the measurement device 1 stores a correspondence table among each lane Li, the main girder closest to the lane Li, and the main girder second closest to the lane Li, and the moving object detection unit 114 may select the sensors 21 and 22 used to detect the vehicle 6 traveling on each lane Li by referring to the corresponding table.

In a case where the positions of the sensors 21 and 22 are not at the end portions of the bridge 5, there may be a difference between timings of actual entry and exit of the vehicle 6 and timings at which the peaks appear in the acceleration data. Therefore, the moving object detection unit 114 may correct peak timings of the acceleration data according to the positions of the sensors 21 and 22, and obtain the entry time and the exit time.

1-7. Calculation of Displacement Amount

In a case where the lane determination unit 113 determines that the vehicle 6 travels on the i-th lane Li of the bridge 5, the displacement amount calculation unit 115 calculates a displacement amount of the bridge 5 due to the vehicle 6 traveling on the lane Li by performing second-order integration on the acceleration data output from the sensor 23 provided on the main girder closest to the lane Li or the main girder second closest to the lane Li. An integration interval of the second-order integration is determined based on the entry time and the exit time to and from the lane Li, the entry time and the exit time being calculated by the moving object detection unit 114. For example, the displacement amount calculation unit 115 may perform second-order integration on the acceleration data in an interval from the entry time to the lane Li or a time just before the entry time to the exit time from the lane Li or a time just after the exit time, the entry time and the exit time being calculated by the moving object detection unit 114.

The displacement amount calculation unit 115 may remove direct current (DC) components from the acceleration data such that the integration result does not diverge due to an offset of the sensor 23.

1-8. Calculation of Weight of Vehicle

The weight calculation unit 116 calculates a weight of the vehicle 6, by using WIM, based on the displacement of the bridge 5 due to the vehicle 6 traveling on the lane Li and the influence line data, the displacement being calculated by the displacement amount calculation unit 115. Specifically, the weight calculation unit 116 calculates an axle weight for each axle using the influence line data and the entry time and the exit time of each axle of the vehicle 6 to and from the lane Li, and calculates a weight of the vehicle 6 by summing up the calculated axle weights.

Here, when the vehicle 6 travels on each of the first lane L1 to the m-th lane Lm, displacements of the bridge 5 at given points on the lanes L1 to Lm are different from each other. For this reason, pieces of the influence line data E1 to Em for the lanes L1 to Lm are respectively created by causing the reference vehicle to travel on each of the lanes L1 to Lm, and the pieces of the influence line data E1 to Em are stored in advance in the storage unit 130. The weight calculation unit 116 calculates a weight of the vehicle 6, by using WIM, based on the displacement of the bridge 5 due to the vehicle 6 traveling on the lane Li and the influence line data Ei for the lane Li.

1-9. Determination of Execution of Calculation

Figure 10:
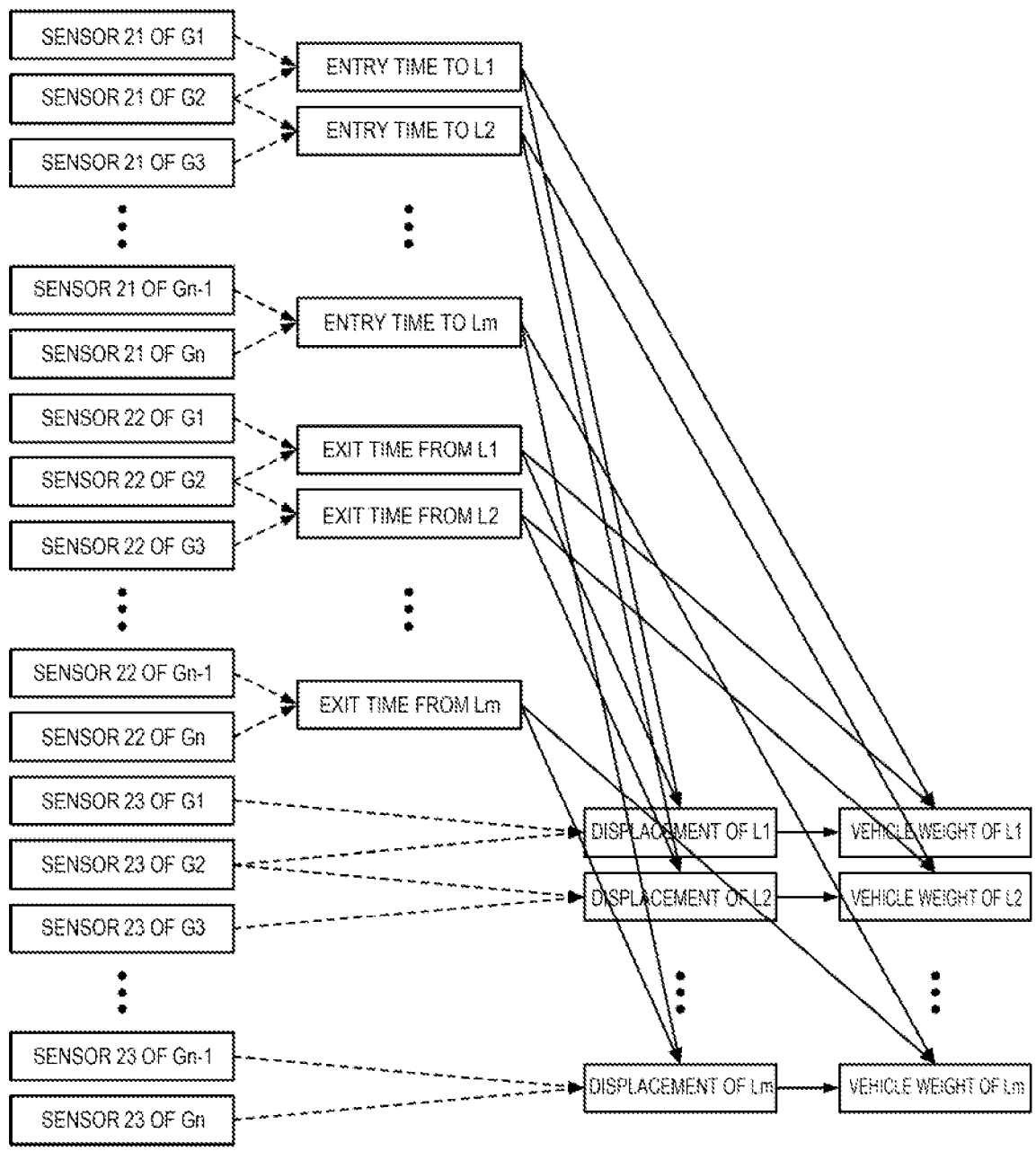
FIG. 10 is a data flow diagram illustrating a relationship between pieces of data required for calculating a weight of a vehicle.

FIG. 10 is a data flow diagram illustrating a relationship between pieces of data required for calculating the weight of the vehicle 6 traveling on each lane by using WIM in the example of FIGS. 2 and 3. In FIG. 10, a broken line arrow indicates that one of two data inputs is required for a calculation, and a solid line arrow indicates that data inputs are essential for a calculation.

As illustrated in FIG. 10, in the moving object detection unit 114, in order to calculate the entry time of the vehicle 6 to the lane Li, at least one of the acceleration data output from the sensor 21 provided on the main girder closest to the lane Li and the acceleration data output from the sensor 21 provided on the main girder second closest to the lane Li is required. Similarly, in the moving object detection unit 114, in order to calculate the exit time of the vehicle 6 from the lane Li, at least one of the acceleration data output from the sensor 22 provided on the main girder closest to the lane Li and the acceleration data output from the sensor 22 provided on the main girder second closest to the lane Li is required.

Therefore, when the abnormality determination unit 112 determines that the sensor 21 provided on the main girder closest to the lane Li of the bridge 5 or the main girder second closest to the lane Li is not abnormal among the k sensors 21, the moving object detection unit 114 detects the vehicle 6 traveling on the lane Li based on the acceleration data output from the sensor 21 and calculates the entry time of the vehicle 6 to the lane Li. Similarly, when the abnormality determination unit 112 determines that the sensor 22 provided on the main girder closest to the lane Li of the bridge 5 or the main girder second closest to the lane Li is not abnormal among the p sensors 22, the moving object detection unit 114 detects the vehicle 6 traveling on the lane Li based on the acceleration data output from the sensor 22 and calculates the exit time of the vehicle 6 from the lane Li.

In a case where the vehicle 6 travels on the lane Li of the bridge 5, when both of the sensor 21 provided on the main girder closest to the lane Li and the sensor 21 provided on the main girder second closest to the lane Li are abnormal, the moving object detection unit 114 does not calculate the entry time of the vehicle 6 to the lane Li. Further, even when the sensor 21 provided on the main girder closest to the lane Li is abnormal and the sensor 21 is not provided on the main girder second closest to the lane Li, or even when the sensor 21 provided on the main girder second closest to the lane Li is abnormal and the sensor 21 is not provided on the main girder closest to the lane Li, the moving object detection unit 114 does not calculate the entry time of the vehicle 6 to the lane Li.

Similarly, when the vehicle 6 travels on the lane Li of the bridge 5, when both of the sensor 22 provided on the main girder closest to the lane Li and the sensor 22 provided on the main girder second closest to the lane Li are abnormal, the moving object detection unit 114 does not calculate the exit time of the vehicle 6 from the lane Li. Further, even when the sensor 22 provided on the main girder closest to the lane Li is abnormal and the sensor 22 is not provided on the main girder second closest to the lane Li, or even when the sensor 22 provided on the main girder second closest to the lane Li is abnormal and the sensor 22 is not provided on the main girder closest to the lane Li, the moving object detection unit 114 does not calculate the exit time of the vehicle 6 from the lane Li.

Further, in the displacement amount calculation unit 115, in order to calculate a displacement amount of the bridge 5 on the lane Li, at least one of the acceleration data output from the sensor 23 provided on the main girder closest to the lane Li and the acceleration data output from the sensor 23 provided on the main girder second closest to the lane Li, information on the entry time of the vehicle 6 to the lane Li, and information on the exit time of the vehicle 6 from the lane Li are required, the information being required for specifying an integration interval of second-order integration on the acceleration data. Therefore, when the abnormality determination unit 112 determines that the sensor 23 provided on the main girder closest to the lane Li of the bridge 5 or the main girder second closest to the lane Li is not abnormal among the q sensors 23, the displacement amount calculation unit 115 calculates a displacement amount of the bridge 5 on the lane Li based on the acceleration data output from the sensor 23 and the entry time and the exit time of the vehicle 6 to and from the lane Li, the entry time and the exit time of the vehicle 6 being information on the vehicle 6 detected by the moving object detection unit 114. The entry time of the vehicle 6 to the lane Li is a time when the first axle of the vehicle 6 enters the lane Li, and the exit time of the vehicle 6 from the lane Li is a time when the last axle of the vehicle 6 exits from the lane Li.

In a case where the vehicle 6 travels on the lane Li of the bridge 5, when both of the sensor 23 provided on the main girder closest to the lane Li and the sensor 23 provided on the main girder second closest to the lane Li are abnormal, the displacement amount calculation unit 115 does not calculate a displacement amount of the bridge 5 on the lane Li. In addition, even when the sensor 23 provided on the main girder closest to the lane Li is abnormal and the sensor 23 is not provided on the main girder second closest to the lane Li, or even when the sensor 23 provided on the main girder second closest to the lane Li is abnormal and the sensor 23 is not provided on the main girder closest to the lane Li, the displacement amount calculation unit 115 does not calculate a displacement amount of the bridge 5 on the lane Li. Further, even when the moving object detection unit 114 does not calculate at least one of the entry time of the vehicle 6 to the lane Li and the exit time of the vehicle 6 from the lane Li, the displacement amount calculation unit 115 does not calculate a displacement amount of the bridge 5 on the lane Li.

In addition, in the weight calculation unit 116, in order to calculate a weight of the vehicle 6 traveling on the i-th lane Li using WIM, information on the entry time and the exit time of the vehicle 6 to and from the lane Li is required for mapping of the influence line data, and information on the displacement amount of the bridge 5 on the lane Li due to the traveling of the vehicle 6 is required. That is, the weight calculation unit 116 calculates a weight of the vehicle 6 traveling on the lane Li based on the entry time and the exit time of the vehicle 6 to and from the lane Li and the displacement amount of the bridge 5 on the lane Li, the entry time and the exit time of the vehicle 6 being information on the vehicle 6 detected by the moving object detection unit 114, and the displacement amount of the bridge 5 being calculated by the displacement amount calculation unit 115.

In a case where the vehicle 6 travels on the lane Li of the bridge 5, when the displacement amount calculation unit 115 does not calculate a displacement amount of the bridge 5 on the lane Li, the weight calculation unit 116 does not calculate a weight of the vehicle 6 traveling on the lane Li.

Figure 11:
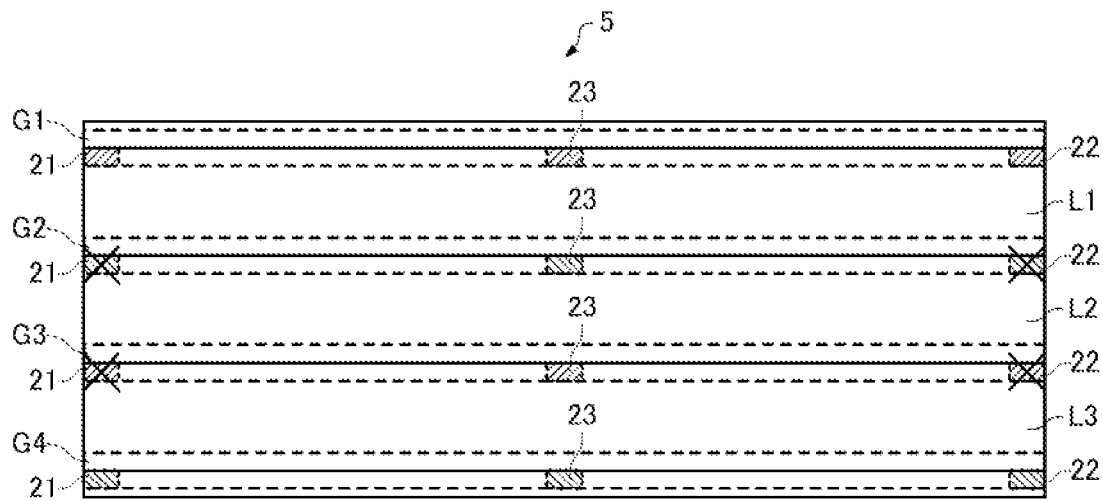
FIG. 11 is a diagram illustrating an example in which some of the sensors are abnormal.
Figure 12:
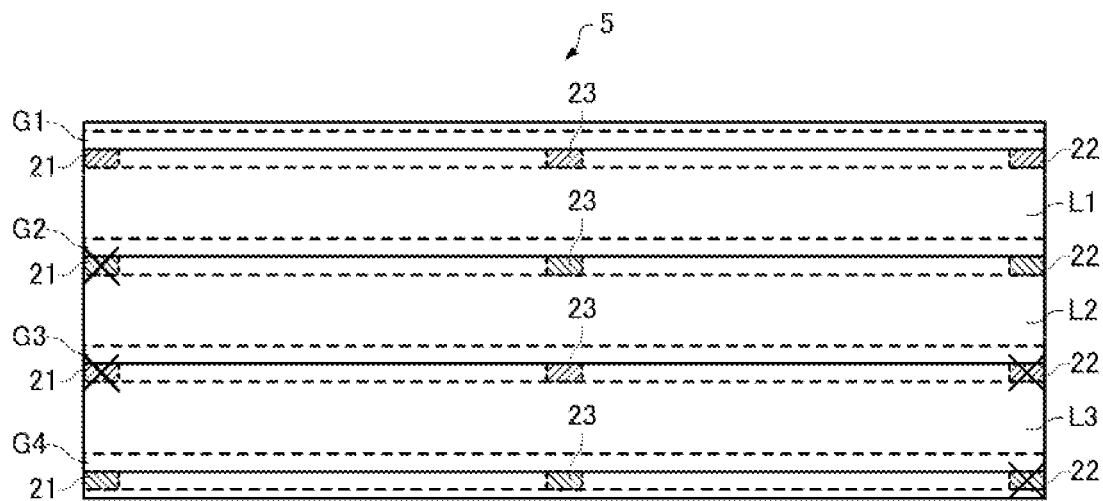
FIG. 12 is a diagram illustrating another example in which some of the sensors are abnormal.
Figure 13:
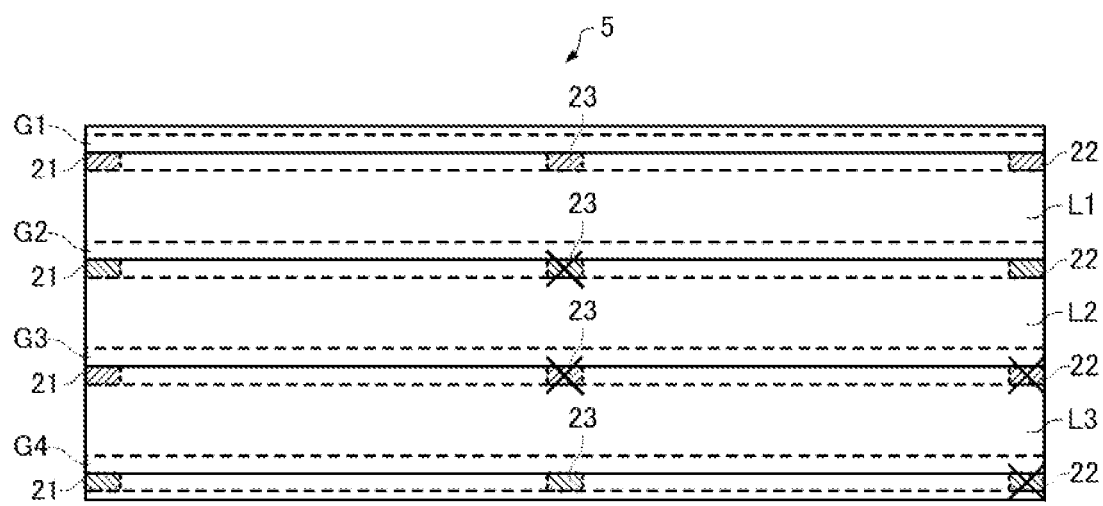
FIG. 13 is a diagram illustrating still another example in which some of the sensors are abnormal.

FIGS. 11, 12, and 13 are diagrams illustrating examples in which some of the sensors 21, 22, and 23 are abnormal. In the examples of FIGS. 11, 12, and 13, the number n of the main girders, the number k of the sensors 21, the number p of the sensors 22, and the number q of the sensors 23 are all 4, and the number m of the lanes is 3. In FIGS. 11, 12, and 13, the abnormal sensors 21, 22, and 23 are marked with "x".

In the example of FIG. 11, the sensors 21 and 22 provided on the main girder G2 and the sensors 21 and 22 provided on the main girder G3 are abnormal, and the other sensors 21, 22, and 23 are not abnormal. In this case, the moving object detection unit 114 calculates the entry time and the exit time of the vehicle 6 to and from the lanes L1 and L3, and does not calculate the entry time and the exit time of the vehicle 6 to and from the lane L2. In addition, the displacement amount calculation unit 115 calculates a displacement amount of the bridge 5 on the lanes L1 and L3 due to the traveling of the vehicle 6, and does not calculate a displacement amount of the bridge 5 on the lane L2 due to the traveling of the vehicle 6. Further, the weight calculation unit 116 calculates a weight of the vehicle 6 traveling on the lanes L1 and L3, and does not calculate a weight of the vehicle 6 traveling on the lane L2.

In the example of FIG. 12, the sensor 21 provided on the main girder G2, the sensors 21 and 22 provided on the main girder G3, and the sensor 22 provided on the main girder G4 are abnormal, and the other sensors 21, 22, and 23 are not abnormal. In this case, the moving object detection unit 114 calculates the entry time of the vehicle 6 to the lanes L1 and L3, and does not calculate the entry time of the vehicle 6 to the lane L2. In addition, the moving object detection unit 114 calculates the exit time of the vehicle 6 from the lanes L1 and L2, and does not calculate the exit time of the vehicle 6 from the lane L3. Further, the displacement amount calculation unit 115 calculates a displacement amount of the bridge 5 on the lane L1 due to the traveling of the vehicle 6, and does not calculate a displacement amount of the bridge 5 on the lanes L2 and L3 due to the traveling of the vehicle 6. Further, the weight calculation unit 116 calculates a weight of the vehicle 6 traveling on the lane L1, and does not calculate a weight of the vehicle 6 traveling on the lanes L2 and L3.

In the example of FIG. 13, the sensor 23 provided on the main girder G2, the sensors 22 and 23 provided on the main girder G3, and the sensor 22 provided on the main girder G4 are abnormal, and the other sensors 21, 22, and 23 are not abnormal. In this case, the moving object detection unit 114 calculates the entry time of the vehicle 6 to the lanes L1, L2, and L3. In addition, the moving object detection unit 114 calculates the exit time of the vehicle 6 from the lanes L1 and L2, and does not calculate the exit time of the vehicle 6 from the lane L3. Further, the displacement amount calculation unit 115 calculates a displacement amount of the bridge 5 on the lane L1 due to the traveling of the vehicle 6, and does not calculate a displacement amount of the bridge 5 on the lanes L2 and L3 due to the traveling of the vehicle 6. Further, the weight calculation unit 116 calculates a weight of the vehicle 6 traveling on the lane L1, and does not calculate a weight of the vehicle 6 traveling on the lanes L2 and L3.

In FIGS. 11, 12, and 13, even when some of the sensors 21, 22, and 23 marked with "x" are not provided on the main girders, an execution of a calculation in the moving object detection unit 114, the displacement amount calculation unit 115, and the weight calculation unit 116 is the same as that in the examples of FIGS. 11, 12, and 13.

1-10. Processing Flow of Calculation of Weight of Vehicle

Figure 14:
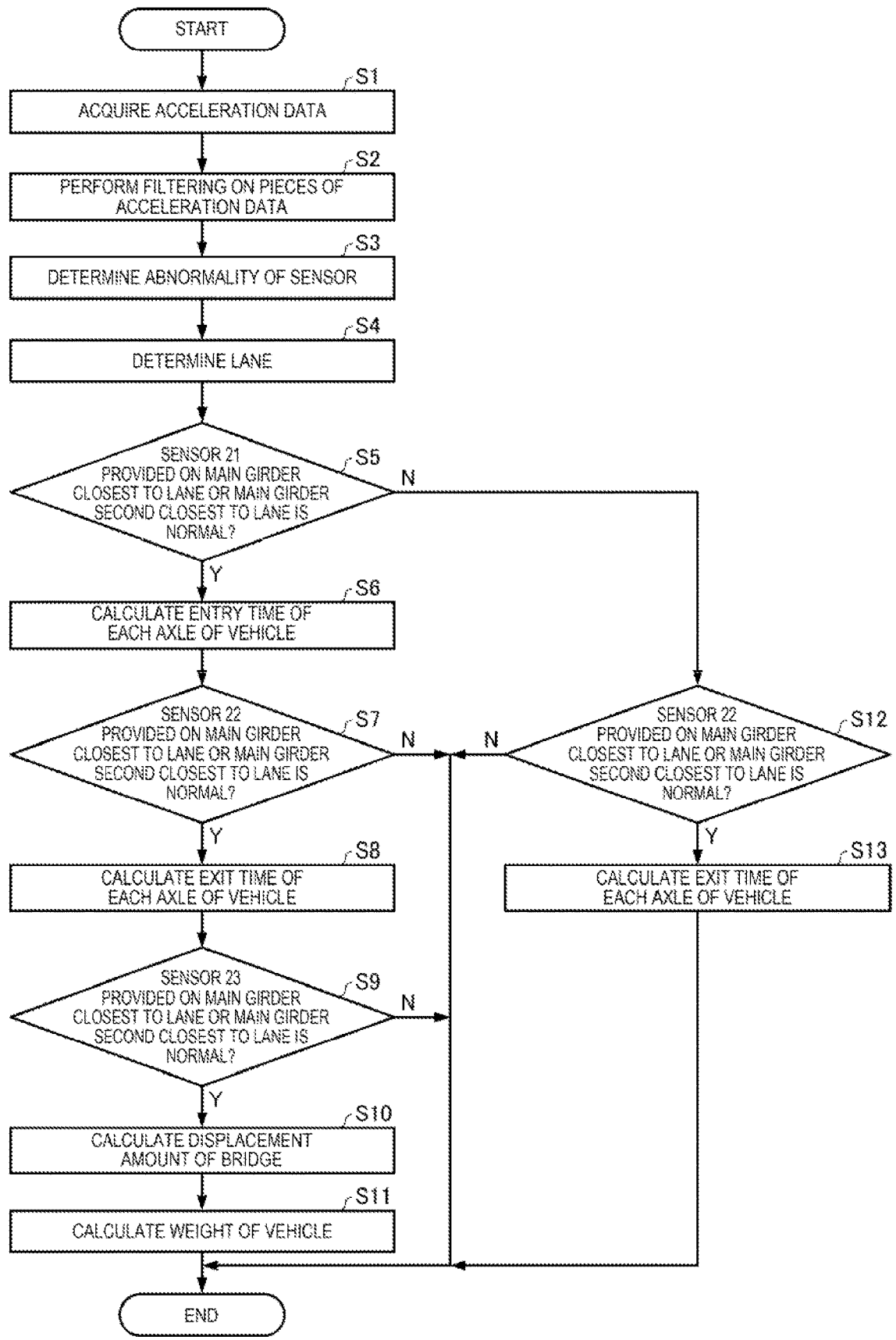
FIG. 14 is a flowchart illustrating a procedure of processing according to the present embodiment.

FIG. 14 is a flowchart illustrating a procedure of processing of calculating a weight of the vehicle 6 as a moving object according to the present embodiment.

As illustrated in FIG. 14, first, the data acquisition unit 111 acquires pieces of acceleration data output from the sensors 21, 22, and 23 (step S1).

Next, the data acquisition unit 111 performs filtering on the pieces of the acceleration data output from the sensors 21 and 22 such that acceleration components due to passage of each axle of the vehicle 6 clearly appear (step S2). For example, the data acquisition unit 111 has a function of a high pass filter (HPF) that passes acceleration components having a frequency of 25 Hz or more. The HPF is configured by using, for example, a finite impulse response (FIR) filter or fast Fourier transform (FFT). In addition, for a purpose of improving clarity of the acceleration components, the data acquisition unit 111 may perform enhancement filtering using a differential filter such as a Laplacian filter.

Next, the abnormality determination unit 112 determines whether or not each of the sensors 21, 22, and 23 is abnormal based on the pieces of the acceleration data acquired in step S1 or the pieces of the acceleration data filtered in step S2 (step S3).

Next, the lane determination unit 113 determines a lane Li on which the vehicle 6 travels based on the pieces of the acceleration data filtered in step S2 (step S4).

Next, when the sensor 21 provided on the main girder closest to the lane Li determined in step S4 or the main girder second closest to the lane Li is normal (Y in step S5), the moving object detection unit 114 calculates the entry time of each axle of the vehicle 6 to the lane Li based on the acceleration data output from the sensor 21 and filtered in step S2 (step S6).

Next, when the sensor 22 provided on the main girder closest to the lane Li or the main girder second closest to the lane Li is normal (Yin step S7), the moving object detection unit 114 calculates the exit time of each axle of the vehicle 6 from the lane Li based on the acceleration data output from the sensor 22 and filtered in step S2 (step S8).

Next, when the sensor 23 provided on the main girder closest to the lane Li or the main girder second closest to the lane Li is normal (Y in step S9), the displacement amount calculation unit 115 calculates a displacement amount of the bridge 5 on the lane Li based on the acceleration data output from the sensor 23 and acquired in step S1, and the entry time calculated in step S6 and the exit time calculated in step S8 (step S10).

Finally, the weight calculation unit 116 calculates a weight of the vehicle 6 traveling on the lane Li, using WIM, based on the influence line data for the lane Li, the entry time calculated in step S6 and the exit time calculated in step S8, and the displacement amount calculated in step S10 (step S11), and the process ends.

Further, in step S5, when both of the sensor 21 provided on the main girder closest to the lane Li and the sensor 21 provided on the main girder second closest to the lane Li are abnormal, when the sensor 21 provided on the main girder closest to the lane Li is abnormal and the sensor 21 is not provided on the main girder second closest to the lane Li, or when the sensor 21 provided on the main girder second closest to the lane Li is abnormal and the sensor 21 is not provided on the main girder closest to the lane Li (N in step S5), the moving object detection unit 114 does not calculate the entry time of each axle of the vehicle 6 to the lane Li. In a case where the sensor 22 provided on the main girder closest to the lane Li or the main girder second closest to the lane Li is normal (Y in step S12), similarly to step S8, the moving object detection unit 114 calculates the exit time of each axle of the vehicle 6 from the lane Li (step S13).

Further, in step S7 or step S12, when both of the sensor 22 provided on the main girder closest to the lane Li and the sensor 22 provided on the main girder second closest to the lane Li are abnormal, when the sensor 22 provided on the main girder closest to the lane Li is abnormal and the sensor 22 is not provided on the main girder second closest to the lane Li, or when the sensor 22 provided on the main girder second closest to the lane Li is abnormal and the sensor 22 is not provided on the main girder closest to the lane Li (N in step S7 or N in step S12), the moving object detection unit 114 does not calculate the exit time of each axle of the vehicle 6 from the lane Li, and the process ends.

Further, in step S9, when both of the sensor 23 provided on the main girder closest to the lane Li and the sensor 23 provided on the main girder second closest to the lane Li are abnormal, when the sensor 23 provided on the main girder closest to the lane Li is abnormal and the sensor 23 is not provided on the main girder second closest to the lane Li, or when the sensor 23 provided on the main girder second closest to the lane Li is abnormal and the sensor 23 is not provided on the main girder closest to the lane Li (N in step S9), the weight calculation unit 116 does not calculate a displacement amount of the bridge 5 on the lane Li, and the process ends.

The step S1 is an example of a data acquisition step. The step S3 is an example of an abnormality determination step. The steps S5, S6, S7, S8, S12, and S13 are an example of a moving object detection step. The steps S9 and S10 are an example of a displacement amount calculating step. The step S11 is an example of a weight calculation step.

1-11. Operation and Effect

In the present embodiment described above, when the abnormality determination unit 112 determines that the sensor 21 provided on the main girder closest to the i-th lane Li of the bridge 5 or the main girder second closest to the lane Li is not abnormal, the moving object detection unit 114 detects the vehicle 6 moving on the lane Li based on the acceleration data output from the sensor 21. Thus, for example, even when the sensor 21 provided on the main girder closest to the lane Li is abnormal, when the normal sensor 21 is provided on the main girder second closest to the lane Li, the moving object detection unit 114 can detect the vehicle 6 traveling on the lane Li based on the acceleration data output from the normal sensor 21 and calculate the entry time of the vehicle 6 to the lane Li. Therefore, according to the measurement device 1, the measurement system 10, and the measurement method of the present embodiment, even when the sensor 21 is abnormal, it is possible to increase a probability that the calculation for detecting the vehicle 6 can be continued.

Further, in the present embodiment, when the abnormality determination unit 112 determines that the sensor 22 provided on the main girder closest to the i-th lane Li of the bridge 5 or the main girder second closest to the lane Li is not abnormal, the moving object detection unit 114 detects the vehicle 6 moving on the lane Li based on the acceleration data output from the sensor 22. Thus, for example, even when the sensor 22 provided on the main girder closest to the lane Li is abnormal, when the normal sensor 22 is provided on the main girder second closest to the lane Li, the moving object detection unit 114 can detect the vehicle 6 traveling on the lane Li based on the acceleration data output from the normal sensor 22 and calculate the exit time of the vehicle 6 from the lane Li. Therefore, according to the measurement device 1, the measurement system 10, and the measurement method of the present embodiment, even when the sensor 22 is abnormal, it is possible to increase a probability that the calculation for detecting the vehicle 6 can be continued.

In addition, in the present embodiment, when the abnormality determination unit 112 determines that the sensor 23 provided on the main girder closest to the i-th lane Li of the bridge 5 or the main girder second closest to the lane Li is not abnormal, the displacement amount calculation unit 115 calculates a displacement amount of the bridge 5 on the lane Li based on the acceleration data output from the sensor 23 and information on the vehicle 6 detected by the moving object detection unit 114. Further, the weight calculation unit 116 calculates a weight of the vehicle 6 traveling on the lane Li based on information on the vehicle 6 detected by the moving object detection unit 114 and the displacement amount of the bridge 5 calculated by the displacement amount calculation unit 115. Thus, in a situation where the moving object detection unit 114 detects the vehicle 6 traveling on the lane Li and calculates the entry time and the exit time of the vehicle 6, for example, even when the sensor 23 provided on the main girder closest to the lane Li is abnormal, when the normal sensor 23 is provided on the main girder second closest to the lane Li, the displacement amount calculation unit 115 can calculate a displacement amount of the bridge 5 due to the vehicle 6 traveling on the lane Li based on the acceleration data output from the normal sensor 23. Further, the weight calculation unit 116 can calculate a weight of the vehicle 6 traveling on the lane Li based on the displacement amount of the bridge 5 calculated by the displacement amount calculation unit 115. Therefore, according to the measurement device 1, the measurement system 10, and the measurement method of the present embodiment, even when the sensor 23 is abnormal, it is possible to increase a probability that the calculation for calculating a displacement amount of the bridge 5 and the calculation for calculating a weight of the vehicle 6 can be continued.

2. Modification Example

The present disclosure is not limited to the present embodiment, and various modifications may be made within the scope and spirit of the present disclosure.

In the above-described embodiment, the sensors 21, 22, and 23 are acceleration sensors. On the other hand, the sensors 21, 22, and 23 are not limited to acceleration sensors. When the sensors 21, 22, and 23 are sensors configured to measure external forces such as acceleration, velocity, displacement, and strain, various measurement techniques such as a displacement/velocity measurement technique using a laser doppler vibrometer, a sampling moire method, or the like may be applied.

In a case where the sensors 21, 22, and 23 are sensors configured to directly measure displacement of the bridge 5, such as strain sensors or displacement meters, integration processing in the displacement amount calculation unit 115 is unnecessary. Here, the strain sensors or the like need to be directly provided on a member of the bridge 5. For example, when the sensors are provided, a step of removing paint is required. On the other hand, the acceleration sensor may be provided on a front surface of the bridge 5 using a magnet or the like, and thus the acceleration sensor is advantageous from a viewpoint of burden in providing the sensor.

Preferably, the sensors 21, 22, and 23 are sensors which allow peaks of output signals to clearly appear and have a fast response, that is, sensors in which the peaks are unlikely to influence on subsequent signals. Preferably, the sensors 21, 22, and 23 are acceleration sensors rather than strain sensors or the like.

Further, a combination of the sensors to be selected as the sensors 21, 22, and 23 is arbitrary. For example, various embodiments are allowed such as an embodiment in which the sensors 21 and 22 are acceleration sensors and the sensor 23 is a strain sensor.

In the measurement device 1 according to the embodiment, a part or most of the processing may be realized by a program. In this case, the measurement device 1 is realized by causing a processor such as a CPU to execute a program. Specifically, a program stored in a non-temporary information storage device is read, and a processor such as a CPU executes the read program. Here, the information storage device such as a computer-readable storage device or a computer-readable storage medium stores programs, data, and the like. A function of the information storage device may be realized by an optical disk such as DVD or CD, a hard disk drive, or a various type memory such as a card type memory or ROM. The processor such as a CPU performs various processing according to the present embodiment based on programs and data stored in the information storage device. That is, the information storage device stores a program for causing a computer to function as each unit according to the present embodiment.

In the embodiment, the measurement device 1 may include a processor and a memory. In the processor, for example, a function of each unit may be realized by individual hardware, or a function of each unit may be realized by integrated hardware. For example, the processor may include hardware, and the hardware may include at least one of a circuit that processes a digital signal and a circuit that processes an analog signal. As the processor, various processors such as a central processing unit (CPU), a graphics processing unit (GPU), or a digital signal processor (DSP) may be used. The memory may be a semiconductor memory such as a static random access memory (SRAM) or a dynamic random access memory (DRAM), may be a register, may be a magnetic storage device such as a hard disk device, or may be an optical storage device such as an optical disk device. For example, the memory stores instructions that can be read by a computer, and the function of each unit of the measurement device 1 is realized by executing the instruction by the processor.

The embodiment and the modification example have been presented by way of example only, and the present disclosure is not limited thereto. For example, each embodiment and each modification example may be combined with each other as appropriate.

The present disclosure includes a configuration that is substantially the same as the configuration described in the embodiment, for example, a configuration that is the same in function, method, and effect, or a configuration that is the same in object and effect. In addition, the present disclosure includes a configuration in which a non-essential part of the configuration described in the embodiment is replaced.

Further, the present disclosure includes a configuration that exhibits the same operational effect as the configuration described in the embodiment or a configuration that can achieve the same object as the configuration described in the embodiment. Furthermore, the present disclosure includes a configuration in which a known technique is added to the configuration described in the embodiment.

What is claimed is:

1. A measurement device comprising:
   a data acquisition unit that acquires first data, second data, and third data, the first data being data output from a first sensor provided on a structure and representing an impact due to one of an entry of a moving object to the structure and an exit of the moving object from the structure, the second data being data output from a second sensor provided on the structure and representing an impact due to the other of the entry of the moving object to the structure and the exit of the moving object from the structure, and the third data being data output from a third sensor provided on the structure and representing a bending of the structure due to the moving object;
   an abnormality determination unit that determines whether or not each of the first sensor, the second sensor, and the third sensor is abnormal;
   a moving object detection unit that detects the moving object moving on the structure based on at least one of the first data and the second data; and
   a displacement amount calculation unit that calculates a displacement amount of the structure based on the third data, wherein
   for an integer m equal to or larger than 1 and an integer n equal to or larger than 1, the structure includes first to m-th lanes and n main girders,
   for an integer k equal to or larger than 1 and equal to or smaller than n, k first sensors are respectively provided on the k main girders of the structure, and
   for an integer i equal to or larger than 1 and equal to or smaller than m, when the abnormality determination unit determines that one of the first sensor provided on a main girder closest to an i-th lane of the structure and a main girder second closest to the i-th lane is not abnormal among the k first sensors, the moving object detection unit detects the moving object moving on the i-th lane based on the first data output from the first sensor that is not abnormal.

2. The measurement device according to claim 1, wherein
   for an integer p equal to or larger than 1 and equal to or smaller than n, p second sensors are respectively provided on p main girders of the structure, and
   when the abnormality determination unit determines that the second sensor provided on the main girder closest to the i-th lane or the main girder second closest to the i-th lane is not abnormal among the p second sensors, the moving object detection unit detects the moving object moving on the i-th lane based on the second data output from the second sensor.

3. The measurement device according to claim 1, wherein the first sensor, the second sensor, and the third sensor are acceleration sensors.

4. A measurement system comprising:
   the measurement device according to claim 1;
   the first sensor;
   the second sensor; and
   the third sensor.

5. The measurement device according to claim 1, wherein
   for an integer q equal to or larger than 1 and equal to or smaller than n, the q third sensors are respectively provided on the q main girders of the structure, and
   when the abnormality determination unit determines that the third sensor provided on the main girder closest to the i-th lane or the main girder second closest to the i-th lane is not abnormal among the q third sensors, the displacement amount calculation unit calculates a displacement amount of the structure on the i-th lane based on the third data output from the third sensor and information on the moving object detected by the moving object detection unit.

6. The measurement device according to claim 5, further comprising:
   a weight calculation unit that calculates a weight of the moving object, wherein
   the weight calculation unit calculates the weight of the moving object moving on the i-th lane based on the information on the moving object detected by the moving object detection unit and the displacement amount of the structure calculated by the displacement amount calculation unit.

7. A measurement method comprising:
   a data acquisition step of acquiring first data, second data, and third data, the first data being data output from a first sensor provided on a structure and representing an impact due to one of an entry of a moving object to the structure and an exit of the moving object from the structure, the second data being data output from a second sensor provided on the structure and representing an impact due to the other of the entry of the moving object to the structure and the exit of the moving object from the structure, and the third data being data output from a third sensor provided on the structure and representing a bending of the structure due to the moving object;
   an abnormality determination step of determining whether or not each of the first sensor, the second sensor, and the third sensor is abnormal;
   a moving object detection step of detecting the moving object moving on the structure based on at least one of the first data and the second data; and
   a displacement amount calculation step of calculating a displacement amount of the structure based on the third data, wherein
   for an integer m equal to or larger than 1 and an integer n equal to or larger than 1, the structure includes first to m-th lanes and n main girders,
   for an integer k equal to or larger than 1 and equal to or smaller than n, the k first sensors are respectively provided on the k main girders of the structure, and
   for an integer i equal to or larger than 1 and equal to or smaller than m, in the abnormality determination step, when it is determined that one of the first sensor provided on the main girder closest to an i-th lane of the structure and the main girder second closest to the i-th lane is not abnormal among the k first sensors, in the moving object detection step, the moving object moving on the i-th lane is detected based on the first data output from the first sensor that is not abnormal.

* * * * *